United States Patent [19]

Moran et al.

[11] Patent Number: 5,471,578
[45] Date of Patent: Nov. 28, 1995

US005471578A

[54] APPARATUS AND METHOD FOR ALTERING ENCLOSURE SELECTIONS IN A GESTURE BASED INPUT SYSTEM

[75] Inventors: Thomas P. Moran, Palo Alto; Patrick Chiu, Menlo Park; William Van Melle, Los Altos, all of Calif.

[73] Assignee: Xerox Corporation, Stamford, Conn.

[21] Appl. No.: 175,841

[22] Filed: Dec. 30, 1993

[51] Int. Cl.⁶ .................................................. G06F 15/00
[52] U.S. Cl. .......................................................... 395/161
[58] Field of Search ................................... 395/143, 155, 395/161; 345/118, 13, 15, 121

[56] References Cited

PUBLICATIONS

"Symbolic Construction of a 2–D Scale–Space Image," IEEE Transactions on Pattern Anaysis and Machine Intelligence, Eric Saund, Aug. 1990, vol. 12, No. 8.

"Issues in Combining Marking and Direct Manipulation Techniques", Gordon Kurtenbach and William Buxton, Nov. 11–13, UIST 1991, pp. 137–144.

aha! InkWriter Quick Reference Guide and Handbook, aha! Software Corporation, Copyright 1993.

*Primary Examiner*—Phu K. Nguyen
*Attorney, Agent, or Firm*—Rosen, Dainow & Jacobs

[57] ABSTRACT

A graphical editing system which allows a user to modify a selection gesture without having to redraw the entire gesture. The system defines a selection with an enclosure that is treated as a graphical object that can be contorted in a style consistent with the specific application. The enclosure can be altered, i.e., reshaped by a set of gestures which allow the user to expand or reduce the size of the enclosure. These alteration gestures activate specified points or portions of the enclosure to control its shape. If a selection enclosure is drawn, it can be altered to include or exclude additional data by drawing a line segment that is detected by its location relative to the selection enclosure as an alteration gesture to reshape the existing enclosure to include the line segment.

18 Claims, 8 Drawing Sheets

APPARATUS AND METHOD FOR ALTERING ENCLOSURE SELECTIONS IN A GESTURE BASED INPUT SYSTEM

RELATED APPLICATIONS

This application is related to U.S. application Ser. No. 07/869,554, filed Apr. 15, 1992, Ser. No. 07/868,559, filed Apr. 15, 1992, Ser. No. 08/101,646, filed Aug. 4, 1993, Ser. No. 08/101,645, filed Aug. 4, 1993, Ser. No. 08/136,360, filed Oct. 14, 1993, entitled Apparatus and Method for Generating Place-holders In a Touch Based Input System, Ser. No. 08/175,853, filed Dec. 30, 1993, entitled Apparatus and Method for Executing Multiple Concatenated Commands Gestures in a Gesture Based Input System, Ser. No. 08/175,850, filed Dec. 30, 1993, entitled Method and Apparatus For Correcting and/or Aborting Command Gestures In a Gesture Based System, Ser. No. 08/175,846, filed Dec. 30, 1993 entitled Apparatus and Method for Translating Graphic Objects and Commands with Direct Touch Input In a Touch Based Input System, and Ser. No. 08/406,340, filed Mar. 13, 1995, entitled Apparatus and Method for Supporting the Implicit Structure of Freeform Lists, Outlines, Text, Tables, and Diagrams in a Gesture-Based Input System and Editing System, all assigned to the present assignee, the disclosures of which are in their entirety, each specifically incorporated by reference herein.

FIELD OF THE INVENTION

This invention pertains to an information input system and method and more particularly to a "gesture based" graphical input system that receives information by sensing the motion of a stylus, pen, finger or mouse.

BACKGROUND OF THE INVENTION

Computer graphic operations that are initiated by pointing devices are typically two types: drawing operations and control operations. Drawing operations describe loci for the placement of visible marks on the image, analogous to drawing on a piece of paper by making a motion with a pen in contact with the surface. Control operations are used to initiate and guide the execution of computer functions leading to modification of the visible marks. Control operations are especially important to the performance of editing functions such as erasing, moving, or changing the visual qualities (e.g. line width) of visible marks of the image.

With most user interface systems, control functions are generally instituted by giving commands to the system (e.g., keyboard command languages, menuing techniques, etc.). Giving commands can be simplified into two parts: specifying (creating or selecting) the command and issuing it, i.e., telling the system to "execute it." Often times users specify commands they wish to change, adjust or abort before they are issued to the system.

In keyboard command languages, the command is typed in and then issued with the Return or Enter key. Usually, the commands can be edited before they are issued. If no specified control key is available to edit the command then the backspace can be used. Often times the whole specified command can be cleared by some control key. In menus, the user can move about the menu selecting or deselecting different items. Even when the menus are hierarchic, it is possible to descend and ascend in the menu hierarchy before selecting an item. An item is issued by the user pressing or lifting a button on the pointing device. If the user does not want to issue any of the items on the menu, the pointing device is moved off of the menu (called a null selection) before the issuing action.

It is noted that the basic function of gesture-based input such as a pen-based notebook computer or Liveboard (trademark of Xerox Corporation) is to allow the user to create graphical objects such as freehand marks by simply drawing ("inking") them. Such a mark is then a data object in the system. Operations can then be performed on these objects by particular control functions known as gestures. A gesture is a handdrawn command and it is a mark created with a stylus input device that is interpreted by the system as designating an action for the system to perform. In order to institute a simple control command by gesture, the user would draw a gesture which represents some desired function and then commit to the command by lifting the input device (e.g. stylus) from the input surface of a display or a button on the device (e.g. mouse). The system is capable of detecting that a user is entering a gesture command on a touch panel instead of data usually by some action taken on the part of the user. Such action may entail holding or exerting pressure on a button on the stylus.

There are many different types of command gestures that operate on specified objects. However, a user must "select" a set of graphical objects before such objects can be operated on. There are many types of command gestures for selecting objects drawn by a user. One is a loop gesture in which objects are selected by drawing a circle around such objects by a freeform gestural stroke. Once specified, the selection can be represented by either highlighting the individual objects and/or by showing the enclosure.

FIG. 2 illustrates such a freeform selection "loop" gesture. A plurality of objects 34 are drawn on touch panel 14 and are selected for a future operation by encircling such objects with freeform selection 32.

Once objects are selected, i.e., are enclosed, the user may desire to alter his/her selection, i.e., add and remove objects from the selection. The user however may not wish to go through the laborious task of redrawing the entire loop gesture. It would be desirable to allow the user to alter the selection loop without having to redraw the entire loop.

OBJECTS AND SUMMARY OF THE INVENTION

It is an object of the present invention to allow the user to alter a selection gesture without having to redraw such gesture.

This object is achieved by a system incorporating the present invention that defines a selection by an enclosure which is treated as a graphical object which can be contorted in a style consistent with the specific application. That is, the enclosure can be altered, i.e., reshaped in accordance with the type of enclosure used.

In particular, gestures are provided for a specific enclosure which allow the user to expand or reduce the size of a specific enclosure. These alteration gestures activate specified points or portions of the enclosure to change its shape. When a selection enclosure is drawn, it can be altered to include or exclude additional data by drawing a line segment which is detected by its location relative to the selection enclosure as a command gesture that reshapes the enclosure to include the line segment. That is, the existing enclosure is stretched to fit the new segment.

If a loop gesture is drawn, for example it can be altered by drawing a line segment that contains two points that are within a predetermined distance from desired locations on the selection enclosure. The system then detects the distance between points on the segment and the locations on the selection enclosure as an alteration gesture. The system then "patches" the segment into the existing selection enclosure, i.e., the system reshapes the selection enclosure to either include the gesture or alternatively to replace the segment defined by the two points on the selection enclosure that are in closest proximity to the alteration gesture with the new alteration gesture. The selection gesture is thus altered to include or exclude objects in the newly formed enclosed loop.

In accordance with the present invention, a graphic editing system is provided which includes a surface and user controllable means for generating a line image on said surface. The system comprises first means responsive to a first user action for generating a first line image on said surface and a second means responsive to a second user action subsequent said first user action that generates a second line image having at least two points located less than a predetermined distance from locations on said first line image for defining a segment of said first line image and for replacing said segment of said first line image with said second line image.

In accordance with an aspect of the present invention, a graphic editing system is provided which include a data interface surface and user controllable means for generating a line image on said surface. The system comprises first means responsive to a first user action that generates a first line on said surface for selecting a first region thereon and a second means responsive to a second user action subsequent said first user action that generates a second line image for modifying the area of the first region.

In accordance with another aspect of the present invention, a graphic editing system is provided which includes a data interface surface and user controllable means for generating a line image on said surface. The system comprises a first means responsive to a first user action that generates a first line image enclosing a first specified region on said surface for selecting said region and a second means responsive to a second user action subsequent said first user action that generates a second line image to reshape said first line image enclosure for enclosing a second region that is different from said first enclosed region and includes at least a portion of said first enclosed region.

In accordance with another aspect of the present invention, a graphic editing system is provided which includes a data interface surface and user controllable means for generating a line image on said surface. The system comprises first means responsive to a first user action that generates a first line image enclosing a first region on said surface and a second means responsive to a second user action subsequent said first user action that generates a second line image to reshape said first line image enclosure to include said second line image.

In accordance with the present invention, a graphic editing method is provided which includes a system having a data interface surface and user controllable means for generating a line image on said surface. The method comprises the steps of generating a first line image on said surface in response to a first user action for selecting a first region on said data surface and generating a second line image on said surface in response to a second user action subsequent to said first user action for modifying the selected region.

In accordance with another object of the present invention, a graphic editing system including a data interface surface and user controllable means for generating a line image on said surface. The system comprises first means responsive to a first user action that generates a first line image on said surface, said line image having first and second ends, and second means responsive to said line generation to project said ends to enclose a first specified region on said surface for selecting said region.

BRIEF DESCRIPTION OF THE DRAWINGS

The invention is illustrated by way of example and not limited by the figures of the accompanying drawings in which like references denote like or corresponding parts and in which.

DESCRIPTION OF THE PREFERRED EMBODIMENT

Figure 1:
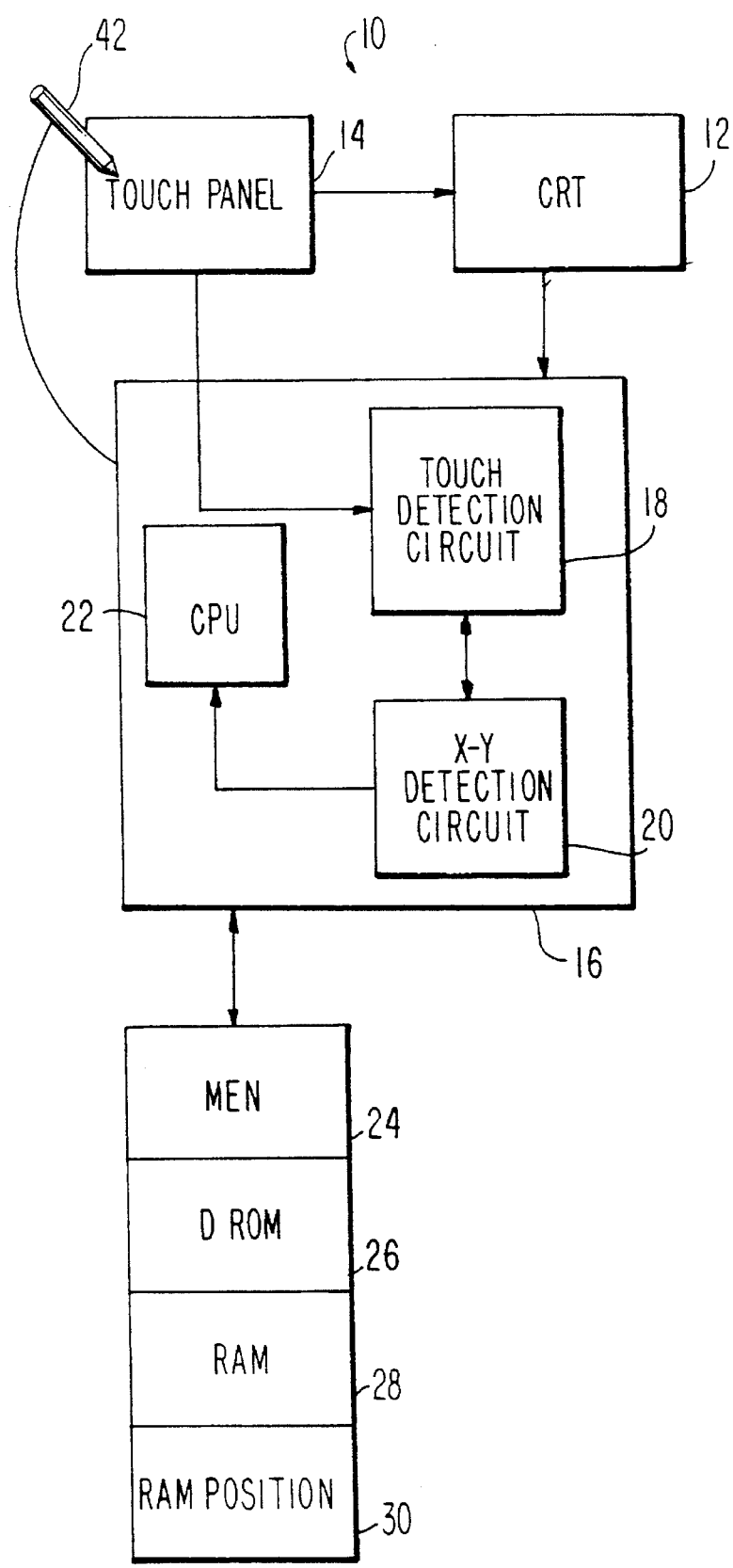
FIG. 1 is a block diagram illustrating one form of touch based input apparatus in which the system according to the present invention can be employed.

Referring to FIG. 1, there is shown a block diagram of the touch based input system 10 including a CRT display 12. A touch sensitive panel 14 is attached onto the surface of CRT display 12. Touch panel 14 is touched by a user and the touch is detected by touch detection circuit 18.

The detected signal from touch detection circuit 18 is input to an X-Y detection circuit 20. X-Y detection circuit 20 processes the input signal and performs an arithmetic operation or the like. Thus, the X-Y detection circuit 20 detects the (x, y) coordinates of the input point touched on the surface of touch panel 14 and transmits such information to CPU 22. Touch panel detection circuit 18, X-Y detection circuit 20 and the CPU 22 combine to form controller 16. Controller 16 performs the control in accordance with the control program stored in program ROM 26 in memory 24. ROM section in memory 24 includes program ROM 26 in which the control program of CPU 22 is stored and pattern data area to store various kinds of character patterns or the like. RAM section 28 of memory 24 includes a RAM portion which is used as a work area of CPU 22 and a character position data area 30 to store display positions of character patterns and the like.

Figure 2:
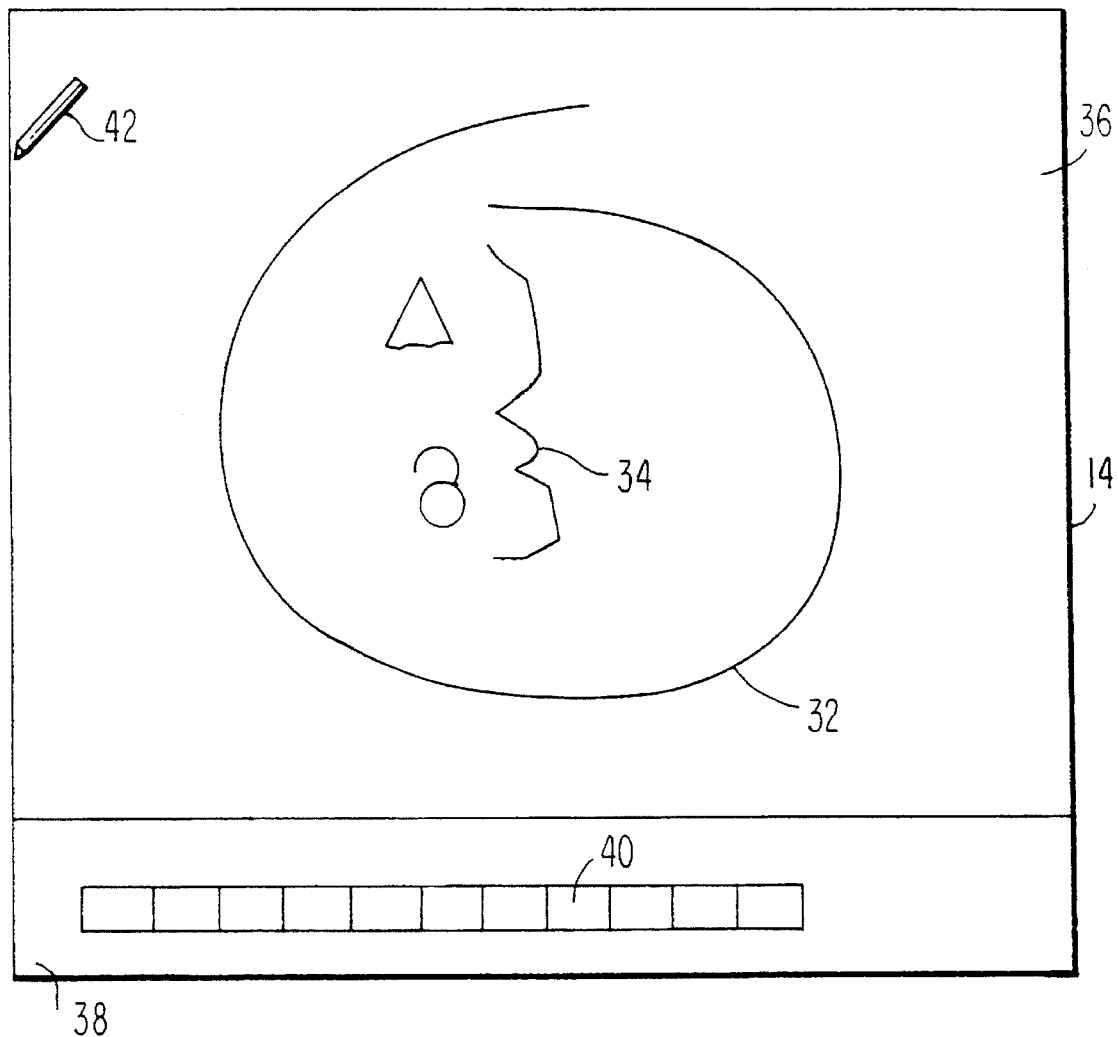
FIG. 2 is an elevational view of a display screen with a loop gesture enclosing several objects.

Specifically, in FIG. 2 touch panel 14 is an electronic input device such as an electronic sketch pad, liveboard or white board which employs a working surface and may employ a plurality of accessible functions 40 as is shown. The working surface is the upper area 36 of touch panel 14 and the accessible functions 40 are positioned at the bottom area 38 of touch panel 14. These functions 40 may include new operation (draw mode), delete, move, shrink and so on. Alternatively, these functions can be accessed by a pie-menu. These functions however are optional in designation, their principal objects being to define operations which are inherent in the operation of the system. These functions may share the some of the same functions that are represented by many designated command gestures.

A suitable user manipulable control or interacting device such as a stylus or light pen or the like 42 is employed to draw input symbols, select functions or draw gestures representative of specified functions. Obviously, other variants within the skill of the art may be employed.

When the user desires to manipulate the objects drawn, the user must first draw a gesture to select various objects on touch panel 14. There are a number of selection gestures available, but the preferred form of selection is by freeform loop or rectangle. FIG. 2 illustrates the freeform loop gesture. As previously indicated a freeform loop is created by drawing a circle around desired objects. A rectangle can be created by a similar action.

Selection however can also be created by a unique concept known as projection. With projected selection, a gesture is drawn and a spatial projection from its shape is created to include objects that are distant from the gesture. That is, the segment parts of the gesture are projected to some remote location (border or limit). An area of selection is created which is defined by the projected segment parts or extensions of the selection.

Figure 4A:
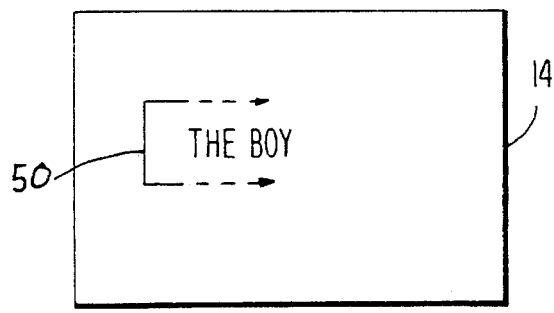
FIGS. 4(a) and 4(b) illustrate selection by the gesture shown in FIG. 3(a)
Figure 4B:
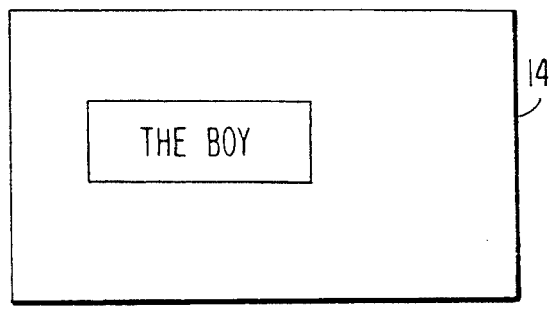
Figure 3B:
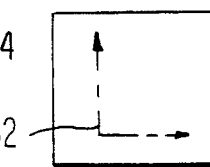
FIGS. 3(a) and (b) illustrate two different gestures used for selecting by projection as well as for alteration by projection according to the preferred embodiment of the present invention.
Figure 3A:
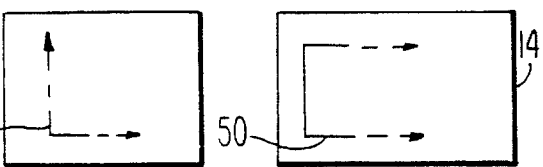

There are two preferred gestures that are used as a basis for projection. These are the square bracket "[" 50 and "L" shaped gesture 52 shown in FIGS. 3(a) and 3(b), respectively. With respect to the bracket gesture shown in FIG. 4(a), the two ends of the bracket are projected horizontally to the right until some border or limit is reached to terminate the projection. The objects that fall within the area defined by the projected parts or the extensions of the selection gesture are selected. In FIG. 4(b), the whole row of objects to the right of the bracket gesture are selected.

Figure 5A:
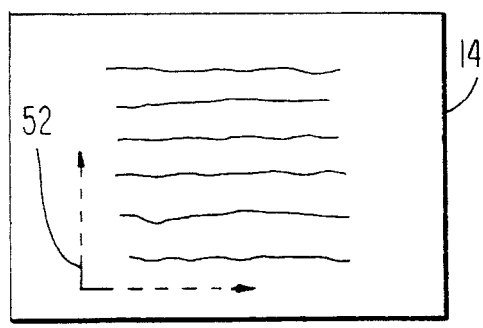
FIGS. 5(a) and 5(b) illustrate selection by the gesture shown in FIG. 3(b)
Figure 5B:
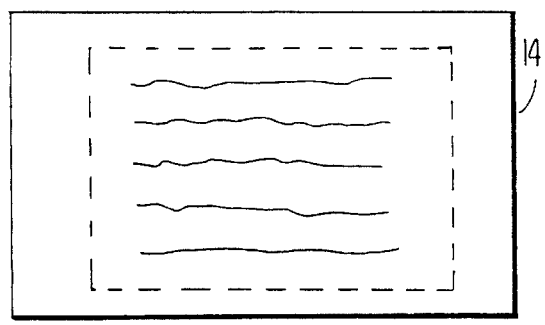

With respect to the "L" shaped gesture 52 shown in FIG. 5(a), the legs of the gesture are projected, one vertically and one horizontally, to some limit or border to terminate the selection. The objects that fall within the area defined by the projection are selected for enclosure. In FIG. 5(b), the "L" shaped gesture drawn in the corner location on the touch panel 14 selects the entire page. The border or limit described above is the end of a page. A page is defined as the edge of the geometric surface that contains all of the information in an application. All information however may not be visible on the display but may be accessed by scrolling through screens on the display. However borders or limits for projection may be defined by any specified application such as a window border.

Importantly, the brackets and "L" shaped gestures represent the sides or the corners of the rectangular selection enclosures. The gestures described can be drawn in any direction on the touch panel 14 to apply projection selection.

Figure 6:
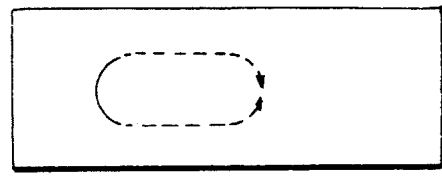
FIG. 6 illustrates selection by projection techniques using an arc gesture according to an alternative embodiment of the present invention.

In sum, when using projection selection, a large selection area can be obtained using a small gesture. Also the concept of projection to select may go beyond rectangular selections such as a small round arc projecting to a small ellipse as shown in FIG. 6. However, it is not quite as easy for a user to predict the area of projection from the geometric shape of an arc as it is to predict the area of projection of a straight line. Therefore, the bracket and L shape gestures are used for selection by projection.

Figure 7A:
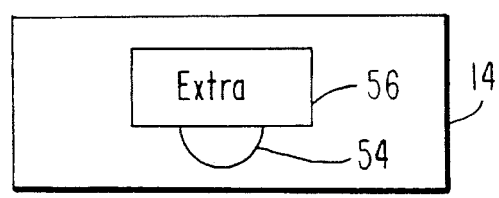
FIGS. 7(a) and 7(b) illustrate a round alteration gesture operating on rectangular selection enclosures by patching techniques according to another embodiment of the present invention.
Figure 7B:
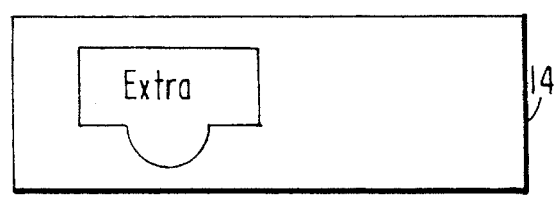

As indicated above, there are two main classes of selections in the preferred embodiment: freeform and rectangular selections. There are two techniques to alter these selection gestures: patching and projection. Patching adds a line that is patched into the existing selection enclosure to change its shape. This can be used on round as well as rectangular selections. If a round patch is added to a rectangle, then the resulting shape is mixed: partly round and partly rectangular. For example, if a round patch 54 is added to a rectangle 56 as shown in FIG. 7(a), then the resulting shape is mixed as is shown in FIG. 7(b). A patch is created, i.e., a selection gesture is reshaped to include a line that represents an alteration gesture when the endpoints of the line are drawn within a predetermined distance from the selection enclosure. If the endpoints of an alteration "patch" gesture are not drawn within a predetermined distance from the selection enclosure, then a new selection enclosure is created.

Figure 8A:
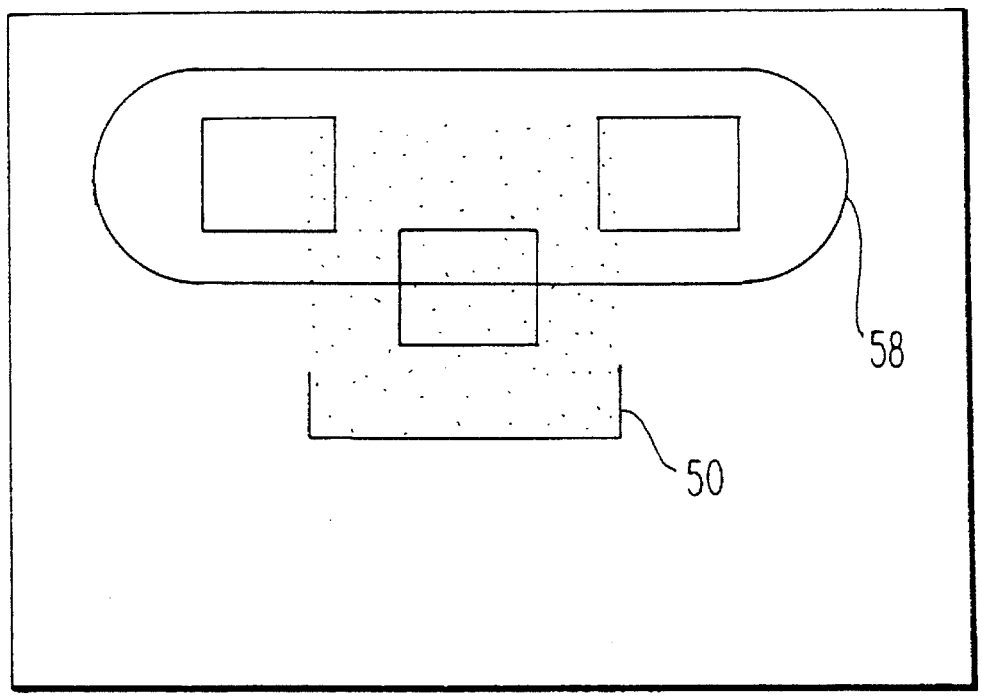
FIGS. 8(a) and 8(b) illustrate a rectangular alteration gesture operating on a freeform selection gesture by projection techniques according to another embodiment of the present invention.
Figure 8B:
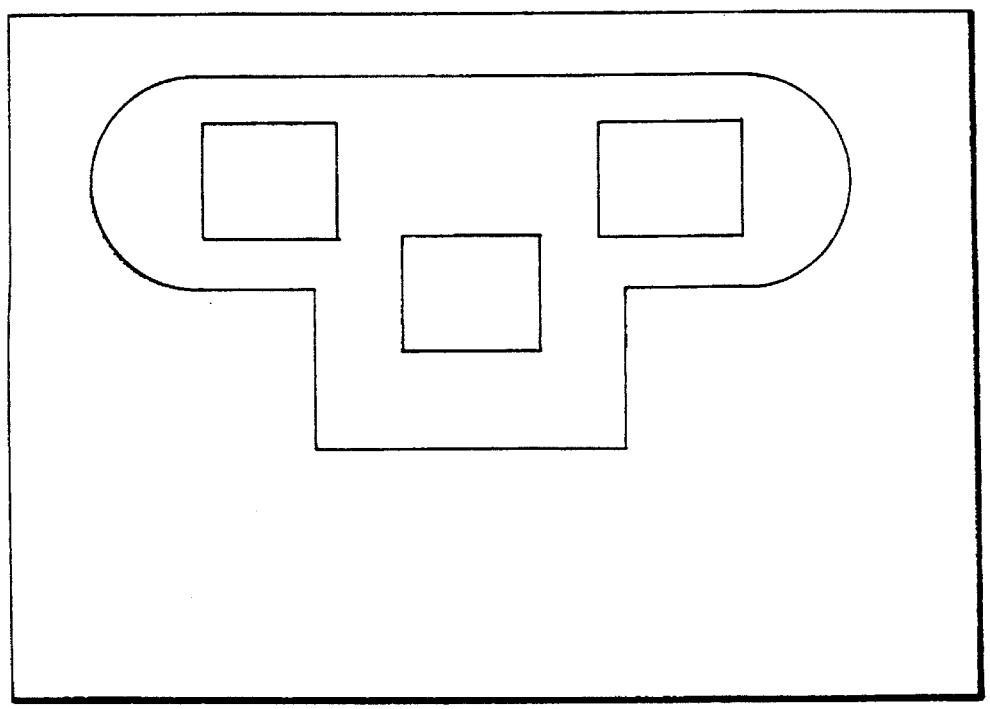

Alteration by projection is based on the same principles described above with respect to selection. FIGS. 8(a) and 8(b) illustrate an example of projection alteration. In FIG. 8(a) a bracket gesture 50 acts on a freeform selection enclosure 58. The result as shown in FIG. 8(b) is a rectangle and round shape combination. Alteration by projection is created when that alteration gesture "matches" the existing selection enclosure. "Matching" occurs when the area defined by the projected edges or extensions of the alteration gesture physically intersects the area defined by the boundaries of the selection enclosure. If intersection is detected then the selection enclosure is reshaped to include the new alteration gesture. If the respective areas do not intersect, then a new selection enclosure is created and the existing selection is removed.

Figure 9A:
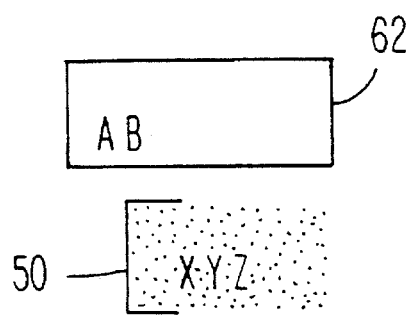
FIGS. 9(a) and 9(b) illustrate a rectangular alteration gesture operating by projection techniques on a rectangular enclosure according to a preferred embodiment of the present invention.
Figure 9B:
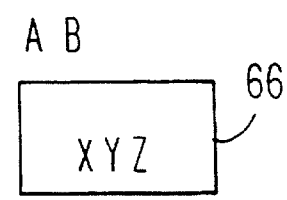
Figure 10A:
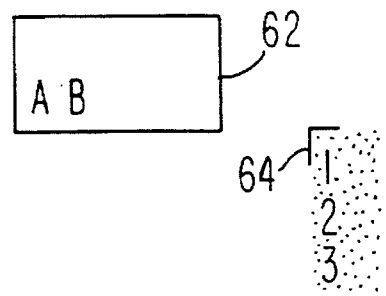
FIGS. 10(a) and 10(b) illustrate another rectangular alteration gesture operating by projection techniques on the rectangular selection enclosure shown in FIGS. 9(a) and 9(b).
Figure 10B:
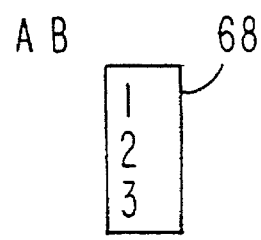
Figure 12:
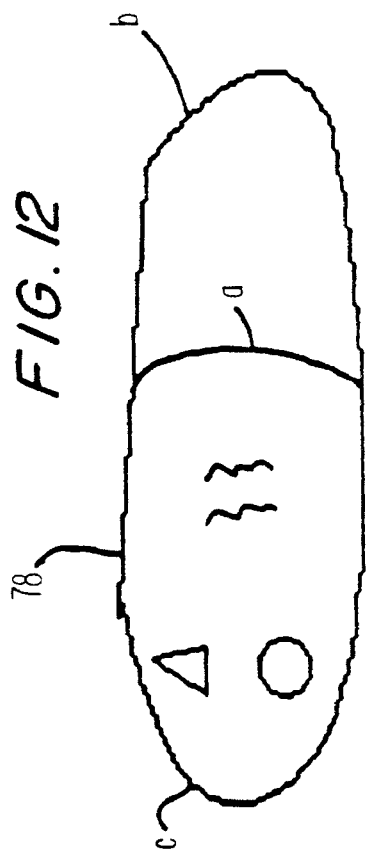
FIG. 12 illustrates an alteration gestural stroke which divides a selection loop into segments.
Figure 11B:
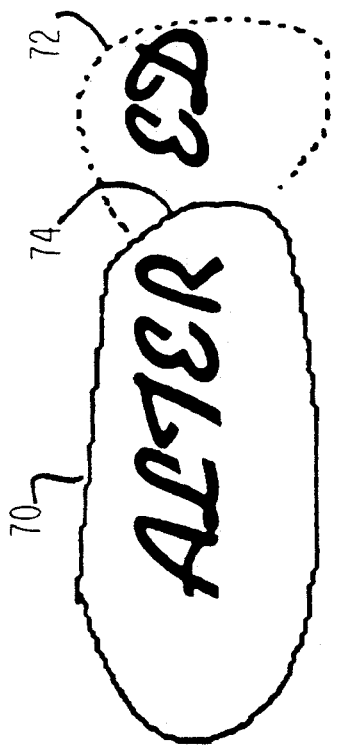
FIGS. 11(a–c) illustrate the operation of the alteration gesture on a loop selection gesture according to the preferred embodiment of the present invention.
Figure 11A:
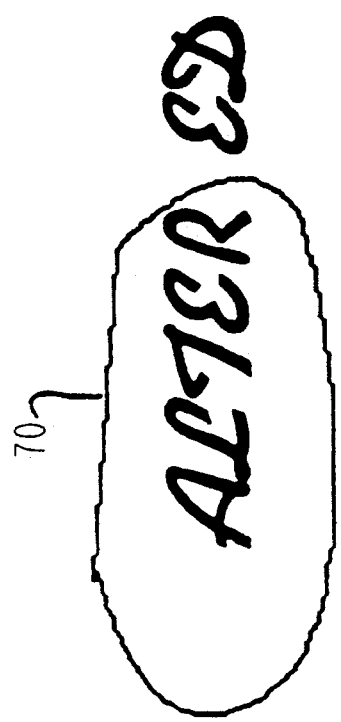
Figure 11C:

In FIG. 8(a), the area defined by the projected edges of bracket 50 is shown intersecting the area defined by the freeform enclosure 58. Thus, the selection enclosure 58 is altered as shown in FIG. 8(b). FIGS. 9(a–b) and 10(a–b) are examples of when intersection does not occur. In FIG. 9(a) the area defined by the projected edges of a bracket does not intersect the area defined by the rectangle enclosing the letters "AB." Since intersection does not occur, then a new rectangular selection enclosure is created around the letters "xyz" and the existing enclosure disappears. Likewise, the area defined by the projected edges of the L-shaped gesture 64 in FIG. 10(a) does not intersect the area defined by the rectangular selection 62 enclosing the letters "AB." Therefore, a new selection enclosure 68 is created around the vertically positioned numbers 1, 2 and 3 shown in FIG. 10(b).

As shown in the drawings, the bracket can be used to enclose text or other data. The bracket can also be enlarged to enclose two lines of text.

In the preferred embodiment, mixed selections are not employed because of the semantics that are attributed to round as opposed to rectangular selections. Therefore, brackets and L shaped gestures are used on rectangular selections only.

FIGS. 11–14 are additional examples of selection enclosures and alterations thereof. FIGS. 11(a)–11(c) show the operations of an alteration gesture acting upon a freeform loop selection 70. In FIG. 11(a), the word "ALTER" has been selected as shown in solid line. Suppose the user wishes to include "ED" in the selection. He/She would draw an alteration gesture 72 around "ED" as shown in FIG. 11(b). The system will then detect that the endpoints of the gesture are within a predetermined distance from the points on the freeform loop.

If the distances are less than the predetermined distance then the line is interpreted as a command to reshape the loop to include the new segment. The alteration gesture 72 will thus reshape the selection gesture to include the alteration gesture at the endpoints thereof or alternatively replace a portion, i.e., segment of the selection gesture loop 74 formed by the points neighboring the endpoints of the alteration gesture 72. The result is the altered gesture 76 shown in FIG. 11(c).

One issue of patching a new segment onto an existing selection is to determine which part of the existing selection is to be replaced. Consider FIG. 12 where an alteration gesture (a) is acting upon freeform selection gesture 78. The alteration gesture (a) divides the loop into two segments (b) and (c). Without specific alteration rules, it is apparent that the system could decide that segment (a) could replace either segment (b) or (c), creating an altered selection loop (ac) or (ab).

In order to avoid this problem, the system can accordingly be constructed to employ one of two rules; the Size Rule or the Acute Angle Rule. The Size Rule replaces the smaller (measure by arc length) segment by (a). The Acute Angle Rule replaces the segment which has acute angles with (a). Here segment (a) makes an acute angle with (b) and thus replaces it. The Size Rule is preferred, however, because the purpose of the alteration gesture is to make a small change to the selection. If the selection requires a major alteration, then it is just as simple to redraw the whole loop. When segments (b) and (c) are nearly equal in size then the Acute Angle Rule may be preferable to use.

Figure 13A:
FIGS. 13(a) and 13(b) illustrate the rectangular gesture shown in FIG. 3(a) operating on a rectangular selection gesture and the resulting selection respectively.
Figure 13B:
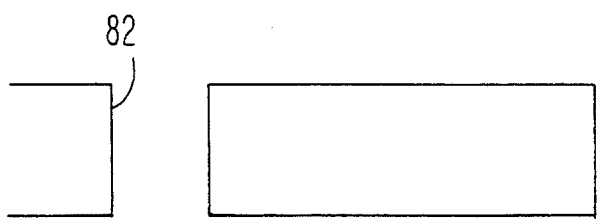

FIGS. 13–15 show alteration operations on rectangular selection enclosure 80 by the projection techniques described above. In FIG. 13(a) a pre-existing rectangular selection 80 is shown, and a subsequent "]" right bracket gesture 82 is drawn to the right of the selection gesture 80 to alter it as desired. The area as defined by the projected edges of the bracket intersects the area that is defined by the selection enclosure. Thus, the rectangular selection enclosure 80 is altered to include the alteration gesture 82. This is shown in FIG. 13(b). Notice that the rectangle is expanded by its length only since the bracket's width is substantially the same as the width of the rectangle.

Figure 14A:
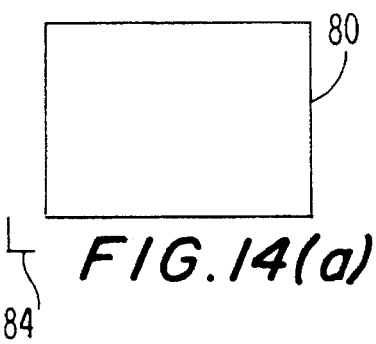
FIGS. 14(a) and 14(b) illustrate the alteration gesture shown in FIG. 3(b) operating on a rectangular selection enclosure and the resulting selection enclosure respectfully.
Figure 14B:
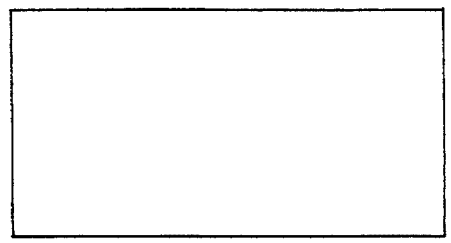
Figure 15A:
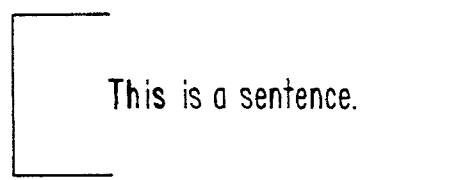
FIGS. 15(a)–(d) illustrate the sequence of operations from selecting textual data to altering the selection enclosure to exclude data using the alteration gesture shown in FIG. 3(a)
Figure 15B:
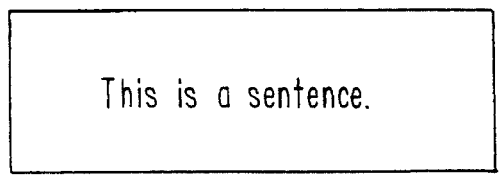
Figure 15C:
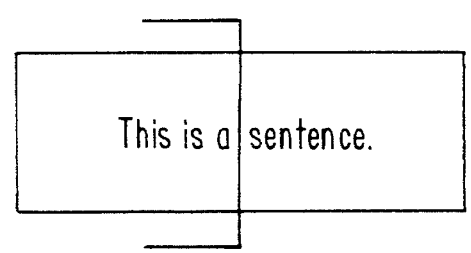
Figure 15D:
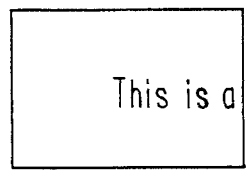

In FIG. 14(a) a rectangular selection enclosure 80 and an L-shaped gesture 84 are shown. The L-shaped gesture 84 is drawn to effect a desired change of the selection enclosure 80. FIG. 14(b) shows the result. The selection enclosure 80 is expanded to include the "L" shaped stroke as part of the selection. The result is shown in FIG. 14(b). Another example of alteration by projection is shown in FIG. 15(a). There a left bracket is used to select all material to its right, i.e., "This is a sentence." The resulting enclosure is shown in FIG. 15(b). If the user wishes to limit the scope of the selection by choosing the words "This is a" for selection rather than the entire sentence then a right bracket is used, as is shown in FIG. 15(c). The resulting selection enclosure is shown in FIG. 15(d).

Figure 16:
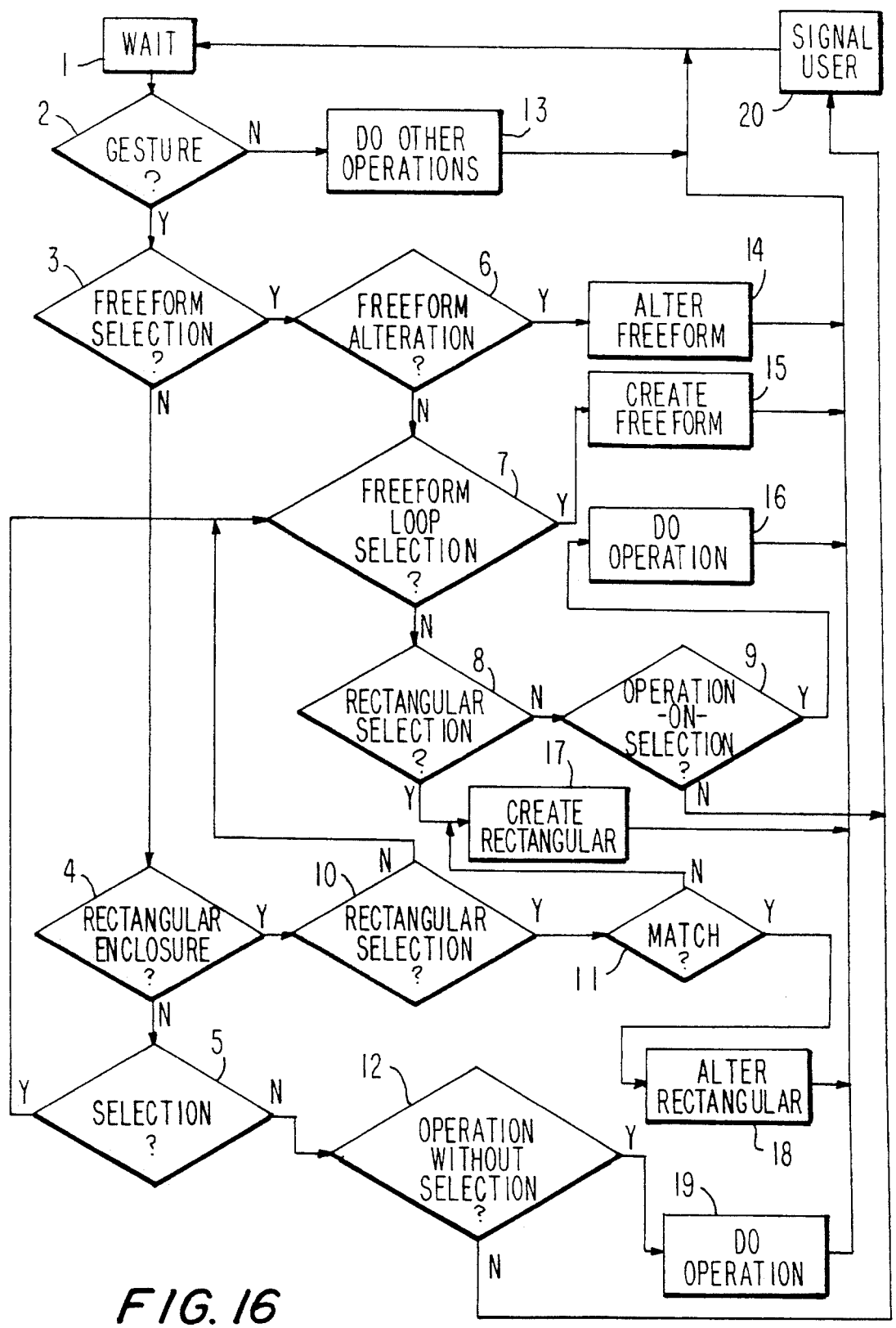
FIG. 16 is a flowchart of the showing the sequence of operations for object manipulation including the operation for employing the present invention.

FIG. 16 is a flowchart illustrating the operations of the system which incorporates the present invention. The text for each element in the flowchart and the corresponding reference numeral are set forth below.

1 Wait for user input; the system is inactive at this step.

2 Is input a gesture?; Once the user enters information, the system determines if the information is a gesture. If information is not a gesture then the system moves to block 13 and performs other operations. Otherwise the system advances to decision diamond 3.

3 Does freeform selection already exist?; If one exists then the system advances to block 6 and determines if the information entered is a freeform alteration gesture. If it is then the system advances to block 14 and alters the existing freeform selection enclosure and then returns to block 1. Otherwise if no freeform selection exists then the system moves to decision diamond 4.

4 Does a rectangular selection enclosure already exist?; If one exists then the system advances to decision diamond 10 and determines if the information entered is a rectangular selection gesture (L-shape or bracket). If no rectangular selection exists the system moves to decision diamond 5.

5 Is input a selection gesture?; If the input information is a selection gesture then the system advances to decision diamond 7. If it is not a selection gesture the system advances to decision diamond 12.

6 Is input a freeform alteration gesture?; If the input information is a freeform alteration gesture then the system advances to block 14 and alters the existing freeform selection gesture. If it is not a freeform alteration gesture then the system advances to decision diamond 7.

7 Is input a freeform loop selection gesture?; If information is a freeform selection gesture then the system advances to block 15 and creates a new freeform loop and returns to block 1. If the input is not a freeform selection then the system moves to decision diamond 8.

8 Is input a rectangular selection gesture?; If the input is a rectangular selection gesture then the system moves to block 17 and creates a new rectangular selection. If the input is not a rectangular selection then the system moves to decision diamond 9.

9 Is input an operation-on-selection gesture?; If input is an operation on a selection gesture then the system advances to block 16 and performs the operation. If it is not then the system causes an error signal to appear indicating a uninterpretable gesture.

10 Is Input a rectangular selection gesture?; Here a rectangular selection already exists. If the input is a rectangular selection then the system moves to decision diamond 11 and determines whether the rectangular selection "matches" the existing selection gesture. That is, the system determines whether the area defined by the projection intersects the area defined by the rectangular selection enclosure. If the input is not a rectangular selection gesture (L-shape or bracket) then the system returns to decision diamond 7 and determines if the input is a freeform selection gesture.

11 Does rectangular alteration gesture "match" existing rectangular selection enclosure?; If the input structured selection "matches" the existing rectangular gesture as described above then the system advances to block 18 and alters the existing selection gesture. Otherwise the system advances to block 17 and creates a new rectangular selection enclosure. Here the pre-existing selection enclosure is removed.

12 Is input an operation-without-selection gesture?; If the input is a gesture that acts without a selection gesture then the system advances to block 19 and performs the operation. If it is not, then the system signals at block 20 that such input is an uninterpretable gesture.

13 Perform other operations; self defining.

14 Alter existing freeform selection; same.

15 Create a new freeform selection; same.

16 Perform operation on existing selection; same.

17 Create a new rectangular selection enclosure; same.

18 Alter existing rectangular selection enclosure; same.

19 Perform operation; same.

20 Signal uninterpretable gesture to user; same.

Although the invention has been described with reference to preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

We claim:

1. A computer-controlled graphic editing system including a display and user controllable means connected to the computer for generating objects on said display and for generating a line image on said display, said system further comprising:

(a) first means for generating a first line image having a first location on said display, said first line image representing selection of a first set of objects on said display, (b) second means responsive to a user action subsequent to generating of said first line image for generating a second line image having a second location on said display, (c) third means for determining whether the second line image has said second location satisfying a predetermined spatial relation to the first location of the first line image, (d) fourth means in response to the third means determining that the second line image does satisfy the predetermined spatial relation for combining the first and second line images to generate a third line image on said display visible to the user, said third line image representing a selection of a second set of objects on the display that is different from said first set of objects.

2. The system according to claim 1, wherein the second line image has end points, and the predetermined spatial relation is the distance between said end points on said second line image and said first line image.

3. The system according to claim 1, wherein the predetermined spatial relation is that the second line image intersects with the first line image.

4. The system according to claim 1, wherein the predetermined spatial relation is that a projection of the second line image intersects with the first line image.

5. The system according to claim 1, wherein the predetermined spatial relation is that the shape of the second line image matches that of an adjacent part of the first line image.

6. A computer-controlled graphic editing system including a display and user controllable means connected to the computer for generating objects on said display and for generating a line image on said display, said system further comprising:

(a) first means responsive to a first user action for generating a first line image having a first location on said display, said first line image representing selection of a first set of objects on said display, (b) second means responsive to a user action subsequent to generating of said first line image for generating a second line image having a second location on said display, (c) third means for determining whether the second line image has said second location satisfying a predetermined spatial relation to the first location of the first line image, (d) fourth means in response to the third means determining that the second line image does satisfy the predetermined spatial relation for combining the first and second line images to generate a third line image on said display visible to the user, said third line image representing a selection of a second set of objects on the display that is different from said first set of objects.

7. The system of claim 6, wherein the second line image is a free-form loop.

8. The system of claim 7, wherein the first line image is a free-form loop.

9. The system of claim 8, wherein the first line image or its projection intersects the second line image.

10. The system of claim 6, wherein the second line image is generated in response to a user drawing action.

11. The system of claim 10, wherein the first line image is generated in response to a user drawing action.

12. A method of altering a selection of a first set of graphical objects displayed on a screen representing a user interface to a graphical application being executed by a computer, said selection having been previously implemented by the computer to generate and store the location of a first line image on the display substantially enclosing the first set of graphical objects, said first line image being interpreted by the computer as a command to select the first set of graphical objects enclosed by said first line image, comprising the steps:

(a) detecting via said computer subsequent user manipulations of the printing device, including user manipulations that cause the computer to generate and store a second line image on the display, (b) determining by the computer whether a predetermined spatial relation exists between the locations of the first and second stored line images, said predetermined spatial relation being interpreted by the computer as a command by the user to alter the selection previously made, (c) when the computer determines that the predetermined spatial relation exists between the locations of the first and second stored line images, combining with the computer the first and second line images to generate and store a third line image on the display substantially enclosing a second set of graphical objects that is different from the first set but includes at least some graphical objects of the first set, said third line image on the display representing an altered selection of graphical objects by the user, said altered selection being visible on the display to the user.

13. The method of claim 12, wherein the predetermined spatial relation is that the second line image or its projection intersects the first line image.

14. The method of claim 12, wherein the second line image has end points, and the predetermined spatial relation is that the end points are located within a predetermined distance of the first line image.

15. The method of claim 12, wherein the predetermined spatial relation is that the second line image matches in shape an adjacent portion of the first line image.

16. A method of altering a selection made by a user of a first set of graphical objects displayed on a screen representing a user interface to a graphical application being executed by a computer, said selection having been previously implemented by the user manipulating a printing device connected to the computer and whose movements are detected by the computer and used by the computer to generate and store the location of a first free-form line image on the display substantially enclosing the first set of graphical objects, said first line image being interpreted by the computer as a command by the user to select the first set of graphical objects enclosed by said first line image, comprising the steps:

(a) detecting via said computer subsequent user manipulations of the printing device, including user manipulations that cause the computer to generate and store a second free-form line image on the display, (b) determining by the computer whether a predetermined spatial relation exists between the locations of the first and second stored line images, said predetermined spatial relation being interpreted by the computer as a command by the user to alter the selection previously made, (c) when the computer determines that the predetermined spatial relation exists between the locations of the first and second stored line images, combining with the computer the first and second line images to generate and store a third free-form line image on the display substantially enclosing a second set of graphical objects that is different from the first set but includes at least some graphical objects of the first set, said third line image on the display representing an altered selection of graphical objects by the user, said altered selection being visible on the display to the user.

17. The method of claim 16, wherein the second free-form line image substantially encloses graphical objects to be included or excluded from the second set.

18. The method of claim 17, wherein the second line image intersects the first line image.

* * * * *